US008868228B2

(12) United States Patent
Otsuki et al.

(10) Patent No.: US 8,868,228 B2
(45) Date of Patent: Oct. 21, 2014

(54) NUMERICAL CONTROLLER HAVING SPEED CONTROL FUNCTION FOR MULTI-AXIS MACHINING DEVICE

(75) Inventors: Toshiaki Otsuki, Minamitsuru-gun (JP); Takafumi Sasaki, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 534 days.

(21) Appl. No.: 13/286,443

(22) Filed: Nov. 1, 2011

(65) Prior Publication Data

US 2012/0221141 A1 Aug. 30, 2012

(30) Foreign Application Priority Data

Feb. 25, 2011 (JP) .................. 2011-039366

(51) Int. Cl.
*G06F 19/00* (2011.01)
*G05B 19/416* (2006.01)
*G05B 19/41* (2006.01)

(52) U.S. Cl.
CPC .............. *G05B 19/41* (2013.01); *G05B 19/416* (2013.01)
USPC ........... 700/189; 700/186; 700/188; 700/190; 700/193

(58) Field of Classification Search
USPC .................. 700/159, 173, 186, 188–190, 193
See application file for complete search history.

(56) References Cited

U.S. PATENT DOCUMENTS

| 4,659,265 | A | * | 4/1987 | Kishi et al. ...................... 409/84 |
| 5,493,502 | A | * | 2/1996 | Niwa ............................. 700/188 |
| 5,545,959 | A | | 8/1996 | Otsuki et al. |
| 5,761,390 | A | * | 6/1998 | Koshishiba et al. .......... 700/250 |
| 6,775,586 | B2 | * | 8/2004 | Shibata et al. ................ 700/189 |
| 8,255,078 | B2 | * | 8/2012 | Otsuki et al. .................. 700/186 |
| 2009/0228138 | A1 | * | 9/2009 | Otsuki et al. .................. 700/187 |
| 2011/0044778 | A1 | | 2/2011 | Yamada et al. |
| 2011/0276173 | A1 | * | 11/2011 | Otsuki et al. .................. 700/173 |

FOREIGN PATENT DOCUMENTS

| JP | 6-332524 | | 12/1994 |
| JP | 2003-195917 | | 7/2003 |
| JP | 2004-185364 | A | 7/2004 |
| JP | 2010-097399 | A | 4/2010 |
| JP | 2011-044081 | A | 3/2011 |
| JP | 2011-076640 | A | 4/2011 |

* cited by examiner

*Primary Examiner* — Ronald Hartman, Jr.
(74) *Attorney, Agent, or Firm* — Drinker Biddle & Reath LLP

(57) ABSTRACT

When a numerical controller executes a tool-center-point control in which a path of a tool center point with respect to a workpiece is instructed, and the workpiece is machined along the instructed path based on a speed instruction, the numerical controller sets the speed instruction so that the speed instruction is a synthesis speed with respect to a synthesis distance of a relative moving distance between the workpiece and a tool center point and a tool-direction changing distance due to a relative change in a tool direction with respect to the workpiece by a rotary axis. The numerical controller interpolates a position of a linear axis and a position of a rotary axis by the tool-center-point control according to the synthesis speed and drives the linear axis and the rotary axis to the position of the linear axis and the position of the rotary axis created by the interpolation.

10 Claims, 6 Drawing Sheets

US 8,868,228 B2

NUMERICAL CONTROLLER HAVING SPEED CONTROL FUNCTION FOR MULTI-AXIS MACHINING DEVICE

RELATED APPLICATION DATA

This application claims priority under 35 U.S.C. §119 and/or §365 to Japanese Application No. 2011-039366 filed Feb. 25, 2011, the entire contents of which is incorporated herein by reference.

BACKGROUND OF THE INVENTION

1. Field of the Invention

The present invention relates to a numerical controller for controlling a multi-axis machining device, which machines a workpiece mounted on a table by using at least three linear axes and at least one rotary axis, wherein a direction of a tool with respect to the workpiece is relatively changed.

2. Description of the Related Art

Japanese Patent Application Laid-Open No. 2003-195917 (corresponding to U.S. Pat. No. 6,775,586) describes a technique for (1) instructing, in a machine having a rotary table, a path of a tool center point with linear axes on a coordinate system (hereinafter referred to as table coordinate system) rotating together with the table, (2) interpolating the instructed path of the tool center point based on a speed instruction so as to obtain "interpolated positional information of the path of the tool center point", and further, interpolating moving instructions of a rotary axis so as to obtain "interpolated positional information of the rotary axis", (3) correcting "the interpolated positional information of the linear axes" based on the obtained "interpolated positional information of the rotary axis", and (4) driving a servo of each corresponding axis based on the corrected "interpolated positional information of the linear axes" and the "interpolated positional information of the rotary axis".

FIG. 1 illustrates an example of a machine in which a table is rotated with two rotary axes (A axis and B axis), and a tool head is moved by three linear axes (X axis, Y axis, Z axis).

A speed is instructed, a path of a tool center point is instructed on a table coordinate system, and moving instructions to a rotary axis is instructed. In FIG. 1, the table coordinate system on the start point of the path of the tool center point is indicated as X1 and Y1, while the table coordinate system at an end point of the path of the tool center point is indicated as X2 and Y2. FIG. 1 illustrates a state in which only the A axis of the rotary axis is moved. The origin of the table coordinate system is defined as a cross point of the rotation center of the A axis and the rotation center of the B axis.

FIG. 2 is a view for describing the path of the tool center point on the table coordinate system.

In FIG. 2, the position of the start point of the path of the tool center point is indicated as (Xs, Ys, Zs), while the position of the end point of the path of the tool center point is indicated as (Xe, Ye, Ze). The path of the tool center point is interpolated on the table coordinate system based on the speed instruction, whereby "interpolated positional information of the path of the tool center point" is obtained as the position of the tool center point on the table coordinate system. The moving instruction for the rotary axis is interpolated such that the interpolation is started together with the start of the interpolation of the path of the tool center point, and the interpolation is ended together with the end of the interpolation of the path of the tool center point, whereby "interpolated positional information of the rotary axis" is obtained.

The "interpolated positional information of the path of the tool center point" is corrected by the "interpolated positional information of the rotary axis" to become a position of a tool control point. The position of the tool control point is apart from the position of the tool center point by a distance corresponding to a tool length compensation vector. A servo for each axis is driven according to the position of the tool control point (i.e., according to the compensated interpolated positional information of the linear axis and the interpolated positional information of the rotary axis). This technique is referred to as a "table-rotating-type tool-center-point control".

Japanese Patent Application Laid-Open No. 6-332524 (corresponding to U.S. Pat. No. 5,545,959) describes a technique for (1) obtaining a distributed movement amount AU for every predetermined cycle on each linear moving axis in case where a linear interpolation is carried out only with the linear moving axis, and (2) calculating a distributed movement amount for every predetermined cycle for each rotary axis that changes an angle of a tool, in association with a number of times of the interpolation, (3) thereby moving the tip end of the tool with the instructed moving speed when machining is done with the tool whose angle with respect to a workpiece is changed. In other words, according to this technique, (1) a path of a tool center point for a linear axis is instructed, in a machine having a rotary tool head, on a coordinate system (more specifically, a machine coordinate system) that does not rotate, (2) the instructed path of the tool center point is interpolated based on a speed instruction so as to obtain "interpolated positional information of the path of the tool center point", and the moving instruction of the rotary axis is interpolated so as to obtain "interpolated positional information of the rotary axis", whereby (3) the "interpolated positional information of the linear axis" is corrected based on the obtained "interpolated positional information of the rotary axis", and (4) a servo of each corresponding axis is driven based on the corrected "interpolated positional information of the linear axis" and the "interpolated positional information of the rotary axis".

FIG. 3 illustrates one example of a machine in which a tool head rotates with two rotary axes (A axis and C axis).

In FIG. 3, a path of a tool center point, in addition to an instructed speed, is instructed, and the movement for the rotary axis is instructed. The position of the start point of the path of the tool center point is indicated as (Xs, Ys, Zs), while the position of the end point of the path of the tool center point is indicated as (Xe, Ye, Ze).

The path of the tool center point is interpolated based on the speed instruction, whereby interpolated positional information of the path of the tool center point is obtained as the position of the tool center point. The moving instruction for the rotary axis is interpolated such that the interpolation is started together with the start of the interpolation of the path of the tool center point, and the interpolation is ended together with the end of the interpolation of the path of the tool center point, whereby "interpolated positional information of the rotary axis" is obtained. The interpolated positional information of the path of the tool center point is corrected by the interpolated positional information of the rotary axis to become a position of a tool control point. The position of the tool control point is defined as a cross point of the rotation center of the A axis and the rotation center of the C axis. The position of the tool control point is apart from the position of the tool center point by a distance corresponding to a tool length compensation vector. A servo for each axis is driven according to the position of the tool control point, i.e., according to the corrected interpolated positional information of the linear axes and the interpolated positional information of the rotary axis. This technique is referred to as a "tool-head-rotating-type tool-center-point control".

The "table-rotating-type tool-center-point control", the "tool-head-rotating-type tool-center-point control", and a "tool-center-point control in a later-described mixed-type machining device (a machining device in which both a table and a tool head rotate)" are collectively referred to as "tool-center-point control".

It has been described here that the "table-rotating-type tool-center-point control" is applied to the machine having two rotary axes that are the A axis and the B axis. However, this control may be applied to a machine having two rotary axes that are an A axis and a C axis, or a machine having two rotary axes that are a B axis and a C axis. This control may also be applied to a machine having only one rotary axis. Similarly, it has been described here that the "tool-head-rotating-type tool-center-point control" is applied to the machine having two rotary axes that are the A axis and the C axis. However, this control may be applied to a machine having two rotary axes that are an A axis and a B axis, or a machine having two rotary axes that are a B axis and a C axis. This control may also be applied to a machine having only one rotary axis. The same is applied to the tool-center-point control in the mixed-type machining device. A numerical controller according to the present invention is applicable to a control of machines having various configurations described above.

The technique of the speed control described in the above-mentioned Patent Document will be described.

The length Dp of the conventional path of the tool center point in an instruction block is obtained from an equation (1) described below. In the table-rotating-type tool-center-point control, the length Dp of the path of the tool center point is the length of the path of the tool center point on the table coordinate system.

$$Dp=\sqrt{(Xe-Xs)^2+(Ye-Ys)^2+(Ze-Zs)^2} \quad (1)$$

Since the length Dp of the path of the tool center point is interpolated based on the speed instruction F, a time T taken for the interpolation of the path of the tool center point is obtained by an equation (2) described below.

$$T = \frac{Dp}{F} \quad (2)$$

The rotary axis is interpolated with the time T, so that a speed Fa of the corresponding rotary axis A axis, a speed Fb of the B axis or a speed Fc of the C axis is expressed by an equation (3) described below. In the equation (3), As, Bs, and Cs are instruction positions on the A axis, B axis and C axis, respectively, at the start point of the path of the tool center point, while Ae, Be, and Ce are instruction positions on the A axis, B axis, and C axis at the end point of the path of the tool center point.

$$\left.\begin{array}{l} Fa = \frac{|Ae - As|}{T} \\ Fb = \frac{|Be - Bs|}{T} \\ Fc = \frac{|Ce - Cs|}{T} \end{array}\right\} \quad (3)$$

The operations illustrated in FIGS. 1 and 3 are based on the instruction described in a Program Example 1 described below.

PROGRAM EXAMPLE 1

N001 G90 X100.0 Y100.0 Z0 A −60.0 B0(C0);
N002 G43.4;
N003 X200.0 A60.0 F10000;

Here, "G43.4" is a G code of the start of the tool-center-point control. The "B0(C0)" means the instruction at 0 degree of the B axis in FIG. 1, and the instruction at 0 degree of the C axis in FIG. 3 (the same is applied to a later-described Program Example 2).

In the block of N003, the length Dp of the path of the tool center point on the instructed coordinate system (the table coordinate system in the table-rotating-type tool-center-point control, and the machine coordinate system in the tool-head-rotating-type tool-center-point control) is 100.0 mm, and the instructed speed instruction F is 10000 mm/min. Therefore, the time T (=100 mm/(1000 mm/60 seconds)) taken for the interpolation of the path of the tool center point becomes 0.6 by substituting the Dp and F into the equation (2). Specifically, when the path of the tool center point having a length of 100.0 mm is interpolated with the speed instruction of 10000 mm/min., interpolation of the block of N003 is completed in 0.6 seconds. With this, the A axis of the rotary axis rotates from the position of −60 degrees to the position of +60 degrees. Accordingly, it is necessary that the A axis rotates with high speed such as (|−60−60|degrees/(0.6/60) minutes=) 12,000 degrees/min. according to the calculation of Fa from the equation (3).

However, the rotary axis cannot rotate with such a high speed, so that the rotary axis cannot follow the movement of the linear axis. Therefore, a machining error may be generated, or vibration of the machine may be produced, or the servo may get in an alarm state and the machining may be stopped, because the rotary axis tries to move with impossible speed.

SUMMARY OF THE INVENTION

It is an object of the present invention to provide a numerical controller that can move a tool together with a rotary axis with a stable speed, and that includes a synthesis speed control unit that sets a speed instruction as a synthesis speed with respect to a synthesis distance of a relative moving distance between the workpiece and a tool center point and a tool-direction changing distance due to a relative change in a tool direction with respect to the workpiece by the rotary axis.

The numerical controller according to the present invention controls a multi-axis machining device which machines a workpiece mounted on a table by using at least three linear axes and at least one rotary axis while changing a relative direction of a tool with respect to the workpiece. The numerical controller executes a tool-center-point control in which a path of a tool center point with respect to the workpiece is instructed so as to machine the workpiece along the instructed path of the tool center point based on a speed instruction. And the numerical controller comprises: a synthesis speed control unit that sets said speed instruction so that said speed instruction is a synthesis speed with respect to a synthesis distance of a relative moving distance between the workpiece and a tool center point and a tool-direction changing distance due to a relative change in a tool direction with respect to the workpiece by the rotary axis; and an interpolation unit that interpolates positions of the linear axes and a position of the rotary axis by the tool-center-point control according to the synthesis speed obtained by the synthesis speed control unit, wherein the linear axes and the rotary axis are driven to the positions of the linear axes and the position of the rotary axis created by the interpolation unit.

The rotary axis may be a rotary axis for rotating a table, wherein the tool-direction changing distance may be obtained by using a later-described equation (5) or (6).

The rotary axis may be a rotary axis for rotating a tool head, wherein the tool-direction changing distance may be obtained by using a later-described equation (9) or (10).

The rotary axis may be a rotary axis for rotating the table and the tool head, wherein the tool-direction changing distance may be obtained by using a later-described equation (11) or (12).

Thus, the present invention can provide a numerical controller that can move a tool together with a rotary axis with a stable speed, and that includes a synthesis speed control unit that sets a speed instruction as a synthesis speed with respect to a synthesis distance of a relative moving distance between the workpiece and a tool center point and a tool-direction changing distance due to a relative change in a tool direction with respect to the workpiece by the rotary axis.

The numerical controller according to the present invention can prevent a machining error, a vibration of a machine, or an occurrence of a servo alarm, enabling to carry out precise machining at a tool center point by a tool-center-point control.

BRIEF DESCRIPTION OF THE DRAWINGS

The aforementioned and other objects and features of the present invention will be apparent from the following description of embodiments with reference to the accompanying drawings in which.

DETAILED DESCRIPTION OF THE PREFERRED EMBODIMENTS

Figure 1:
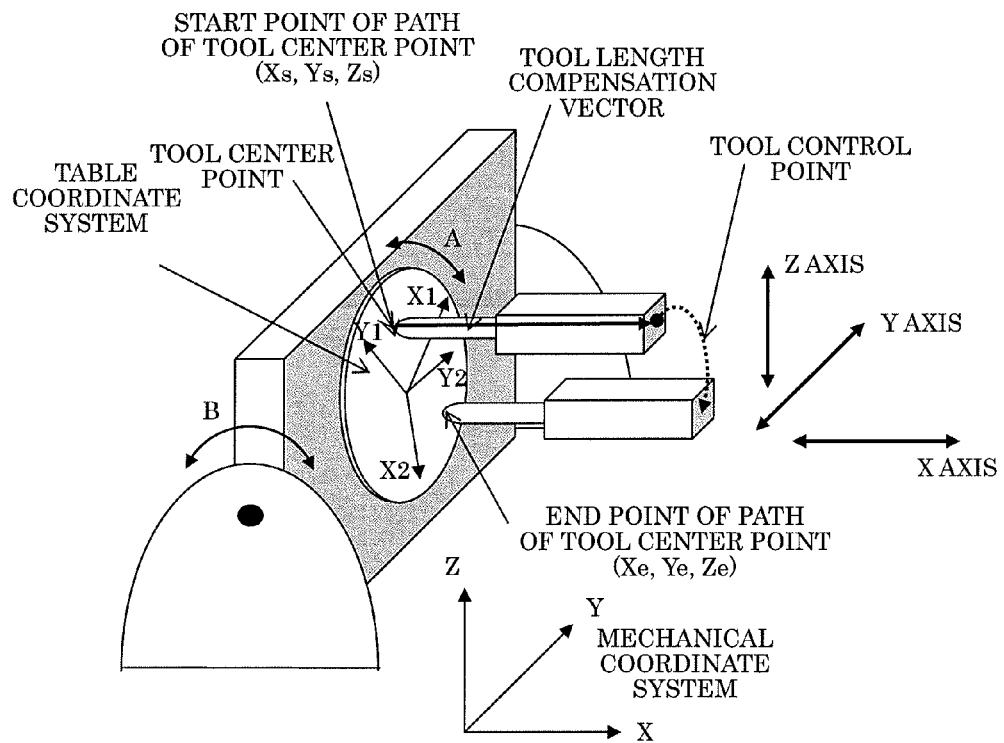
FIG. 1 is a view for describing one example of a machine in which a table is rotated with two rotary axes (A axis and B axis), and a tool head is moved by three linear axes (X axis, Y axis, Z axis)
Figure 2:
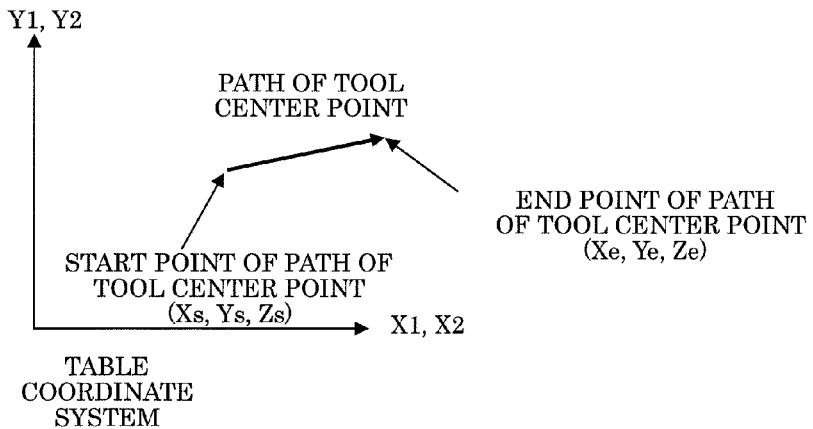
FIG. 2 is a view for describing a path of a tool center point on a table coordinate system.

A machining device controlled by a numerical controller according to the present invention is a multi-axis machining device, which machines a workpiece mounted on a table by using at least three linear axes and at least one rotary axis while changing a relative direction of a tool with respect to the workpiece. The numerical controller controlling the multi-axis machining device sets a speed instruction so that the speed instruction is a synthesis speed with respect to a synthesis distance of a relative moving distance between the workpiece and a tool center point and a tool-direction changing distance due to a relative change in a tool direction with respect to the workpiece by the rotary axis, upon an execution of the tool-center-point control.

In the above-mentioned conventional technique, the path of the tool center point is interpolated based on the speed instruction, and according to this, the rotary axis is interpolated. Therefore, when the length of the path of the tool center point is shorter as compared with the movement amount of the rotary axis, the interpolation time becomes short, so that the speed of the rotary axis may be very fast. This is because the movement amount of the rotary axis is not considered in the speed instruction.

In view of this, in the present invention, the length of the path of the tool center point is calculated as a synthesis distance Dm of a relative moving distance Dp between a workpiece and a tool center point (the same as the length Dp of the path of the tool center point defined in the equation (1)), and a tool-direction changing distance Dr by the relative change in the tool direction to the workpiece by the rotary axis, as expressed in the equation (4) described below.

$$\left. \begin{array}{l} Dp = \sqrt{(Xe - Xs)^2 + (Ye - Ys)^2 + (Ze - Zs)^2} \\ Dm1 = \sqrt{Dp^2 + Dr^2} \\ Dm2 = Dp + Dr \\ Dm = Dm1, \text{ or, } Dm2 \\ Fm = \frac{Dp}{Dm} * F \end{array} \right\} \quad (4)$$

Here, a square root of a square sum of Dp and Dr is defined as Dm1, and added value of Dp and Dr is defined as Dm2, wherein either one of Dm1 and Dm2 is defined as Dm. Alternatively, the average of them may be defined as Dm. Fm is calculated as a synthesis speed with respect to the synthesis distance Dm for the speed instruction F, and the Fm is defined as the speed instruction instead of the speed instruction F. With this, the speed for which the movement amount of the tool resulting from the relative change in the tool direction with respect to the workpiece by the movement of the rotary axis is considered is obtained. The calculation of Dr will be described later.

The positions of the linear axes and the position of the rotary axis are interpolated according to the tool-center-point control with the Fm being defined as the speed instruction, and the linear axes and the rotary axis are driven to the interpolated positions of the linear axes and the interpolated positions of the rotary axis. The interpolation and drive of each axis by the tool-center-point control belong to conventional technique, so that this will not be described in detail.

First Embodiment

Figure 4:
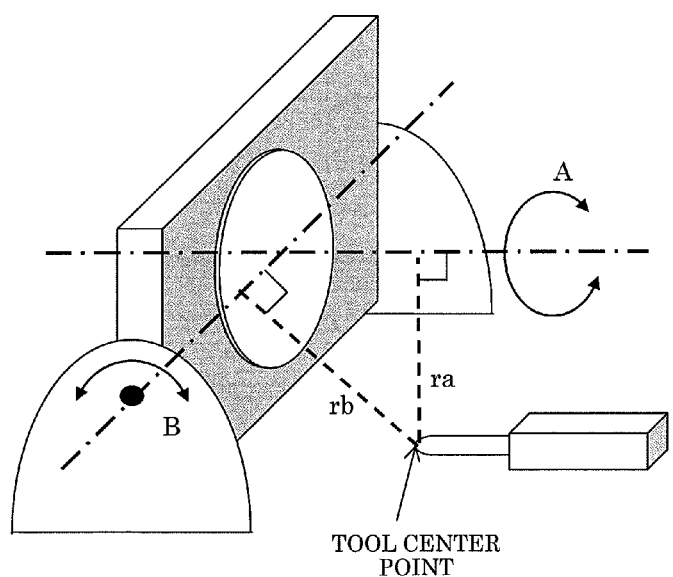
FIG. 4 is a view for describing that, in a table-rotating-type tool-center-point control, a distance from a rotation center of the A axis to a tool center point is defined as ra (the distance from the tool center point to the rotation center of the A axis), while a distance from a rotation center of the B axis to the tool center point is defined as rb.

In the table-rotating-type tool-center-point control illustrated in FIG. 4 with two rotary axes of A axis and B axis, a distance from a rotation center of the A axis to a tool center point is defined as ra, while a distance from a rotation center of the B axis to the tool center point is defined as rb. Generally, ra and rb change in one block.

Figure 5A:
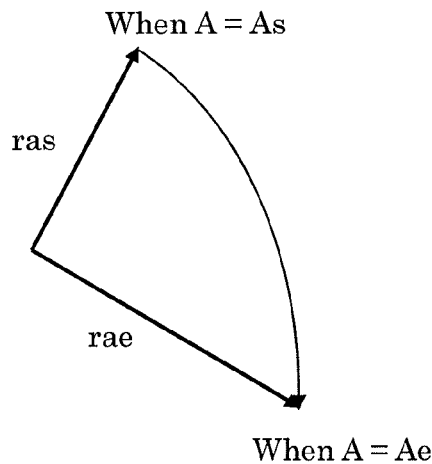
FIG. 5A illustrates an image wherein the distance ra is changed in a certain block, in case where the distance ra at a position As of the A axis at the start point of the path of the tool center point in a certain block is defined as ras, and the distance ra at a position Ae of the A axis at the end point of the path of the tool center point is defined as rae.
Figure 5B:
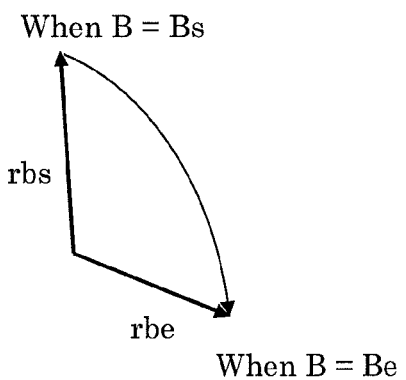
FIG. 5B illustrates an image wherein the distance rb is changed in a certain block, in case where the distance rb at a position Bs of the B axis at the start point of the path of the tool center point in a certain block is defined as rbs, and the distance rb at a position Be of the B axis at the end point of the path of the tool center point is defined as rbe.

FIG. 5A illustrates an image wherein the distance ra is changed in a certain block, in case where the distance ra at a position As of the A axis at the start point of the path of the tool center point in the block is defined as ras, and the distance ra at a position Ae of the A axis at the end point of the path of the tool center point is defined as rae. Similarly, FIG. 5B illustrates an image wherein the distance rb is changed in a certain block, in case where the distance rb at a position Bs of the B axis at the start point of the path of the tool center point is defined as rbs, and the distance rb at a position Be of the B axis at the end point of the path of the tool center point is defined as rbe.

In this case, Drt in an equation (5) is calculated, and the calculated Drt is defined as Dr.

$$Drt = \Sigma \sqrt{ka*\Delta ra^2 + kb*\Delta rb^2 + (ra*\Delta A)^2 + (rb*\Delta B)^2} \quad (5)$$

In the above-mentioned equation,
Drt: Tool-direction changing distance
ra: Distance from the rotation center of the A axis (one rotary axis) to the tool center point
rb: Distance from the rotation center of the B axis (another rotary axis) to the tool center point
$\Delta$ra: Amount of change in ra for each simulation cycle
$\Delta$rb: Amount of change in rb for each simulation cycle
ka: Weighting coefficient of $\Delta$ra
kb: Weighting coefficient of $\Delta$rb
$\Delta$A, $\Delta$B: Amount of change of A axis and B axis for each simulation cycle The equation (5) is for a simulation calculation carried out before the start of the interpolation of a block. In the equation (5), $\Delta$ra and $\Delta$rb are amounts of change of the distances ra and rb for each simulation cycle for carrying out a simulation calculation of Drt. The ka and kb are weighting coefficients for weighting these amounts, wherein ka=kb=1 in general, but they may be constant values other than 1. Only the latter terms are made valid with ka=kb=0, in order that Drt may be defined as the tool-direction changing distance generated only by the movements of the rotary axes. The weighting coefficients ka and kb may be defined as functions of the distances ra and rb. The weighting coefficients ka and kb are applicable to an second embodiment described later. The $\Delta$A and $\Delta$B are amounts of change in the positions of A axis and B axis for each simulation cycle. $\Sigma$ indicates the total in this block. The simulation cycle may be the same as the interpolation cycle. However, carrying out the simulation calculation for each interpolation cycle takes much process time. Therefore, the simulation cycle may be the one formed by thinning out the interpolation cycle. For example, if the interpolation cycle is 1 msec, the simulation cycle in the simulation calculation in the equation (5) may be each 8 msec. The amounts of change $\Delta$A and $\Delta$B assume a radian unit. When there is only one rotary axis, this rotary axis is the subject for the calculation. This is applicable to the other embodiments described later.

Second Embodiment

The Drt may be obtained by an approximate calculation as in an equation (6) described below, instead of the equation (5).

$$Drt = \sqrt{ka*(rae-ras)^2 + kb*(rbe-rbs)^2 + ran^2*(Ae-As)^2 + rbn^2*(Be-Bs)^2} \quad (6)$$

In the above-mentioned equation,
Drt: Tool-direction changing distance
As, Bs: Position of A axis (one rotary axis) and position of B axis (another rotary axis) at the start point of the path of the tool center point
Ae, Be: Position of A axis and position of B axis at the endpoint of the path of the tool center point
ras: Distance from the rotation center of the A axis to the tool center point at the position As of the A axis at the start point of the path of the tool center point
rae: Distance from the rotation center of the A axis to the tool center point at the position of Ae of the A axis at the end point of the path of the tool center point
ran: Value representative of the distance from the rotation center of the A axis to the tool center point in the block
rbs: Distance from the rotation center of the B axis to the tool center point at the position Bs of the B axis at the start point of the path of the tool center point
rbe: Distance from the rotation center of the B axis to the tool center point at the position Be of the B axis at the end point of the path of the tool center point
rbn: Value representative of the distance from the rotation center of the B axis to the tool center point in the block
ka: Weighting coefficient of (rae−ras)
kb: Weighting coefficient of (rbe−rbs)

In the equation (6), the ka is the weighting coefficient of (rae−ras), and the kb is the weighting coefficient of (rbe−rbs). The ran is the value representative of the distance ra in this block, and rbn is the value representative of the distance rb in this block. There are various methods, such as an equation (7) described below, for obtaining ran and rbn. The first to fourth equations in the equation (7) are some of the methods for obtaining ran and rbn, and there are various methods considered. The fourth equation in the equation (7) means that any one of ran and rbn in the first, second, and third equations is selected. The unit of As, Ae, Bs, and Be is radian.

$$\left.\begin{array}{l} 1) \; ran = ras, \; rbn = rbs \\ 2) \; ran = rae, \; rbn = rbe \\ 3) \; ran = \dfrac{ras + rae}{2}, \; rbn = \dfrac{rbs + rbe}{2} \\ 4) \; ran = ras, \text{ or, } rae, \text{ or, } \dfrac{ras+rae}{2}, \; rbn = rbs, \text{ or, } rbe, \text{ or, } \dfrac{rbs+rbe}{2} \end{array}\right\} \quad (7)$$

Third Embodiment

Regarding the instruction of the Program Example 1 described above, an example of a calculation in case where a synthesis distance Dm is obtained from the second equation in the equation (4), and the ran and rbn, which are representative values of the distances ra and rb, are obtained from the third equation in the equation (7) in the second embodiment is indicated by an equation (8) described below. The fifth and sixth equations in the equation (8) mean that the start point (100, 100) and the end point (200, 100) on the table coordinate system are multiplied by a matrix representative of the rotation of the A axis and the absolute value of the Y coordinate of the result is defined as the distance from the rotation center of the B axis to the tool center point. Regarding weighting coefficients ka and kb, ka=kb=1 is assumed.

$$\begin{aligned} Dp &= 100 \\ ras &= \sqrt{100^2 + 100^2} = 141.421 (\text{mm}) \\ rae &= \sqrt{200^2 + 100^2} = 223.607 (\text{mm}) \\ ran &= \dfrac{ras+rae}{2} = 182.514 (\text{mm}) \\ rbs &= |100*\sin 60° + 100*\cos 60°| = 136.603 (\text{mm}) \\ rbe &= |200*\sin(-60°) + 100*\cos(-60°)| = 123.205 (\text{mm}) \\ rbn &= \dfrac{rbs+rbe}{2} = 129.904 (\text{mm}) \\ Drt &= \sqrt{\dfrac{(rae-ras)^2 + (rbe-rbs)^2 + ran^2 *}{(Ae-As)^2 + rbn^2 *(Be-Bs)^2}} \\ &= 391.221 (\text{mm}) \\ Dm &= \sqrt{100^2 + Drt^2} = 403.799 (\text{mm}) \\ Fm &= \dfrac{Dp}{Dm}*F = 2476 (\text{mm}/\min) \\ T &= \dfrac{Dm}{F} = \dfrac{Dp}{Fm} = 2.423 (\sec) \\ Fa &= \dfrac{120}{T} = 2972 (deg/\min) \end{aligned} \quad (8)$$

As described above, according to the embodiment of the present invention, the speed Fa of the A axis, which is the rotary axis, is reduced to 2972 degrees/min., as compared with 12000 degrees/min. in the case of the conventional technique. Thus, it is clear that the invention, the speed Fa of the A axis, which is the rotary axis, is reduced to 2972 degrees/min., as compared with 12000 degrees/min. in the case of the conventional technique. Thus, it is clear that the embodiment of the present invention makes the speed Fa of the A axis more stable.

Fourth Embodiment

Figure 3:
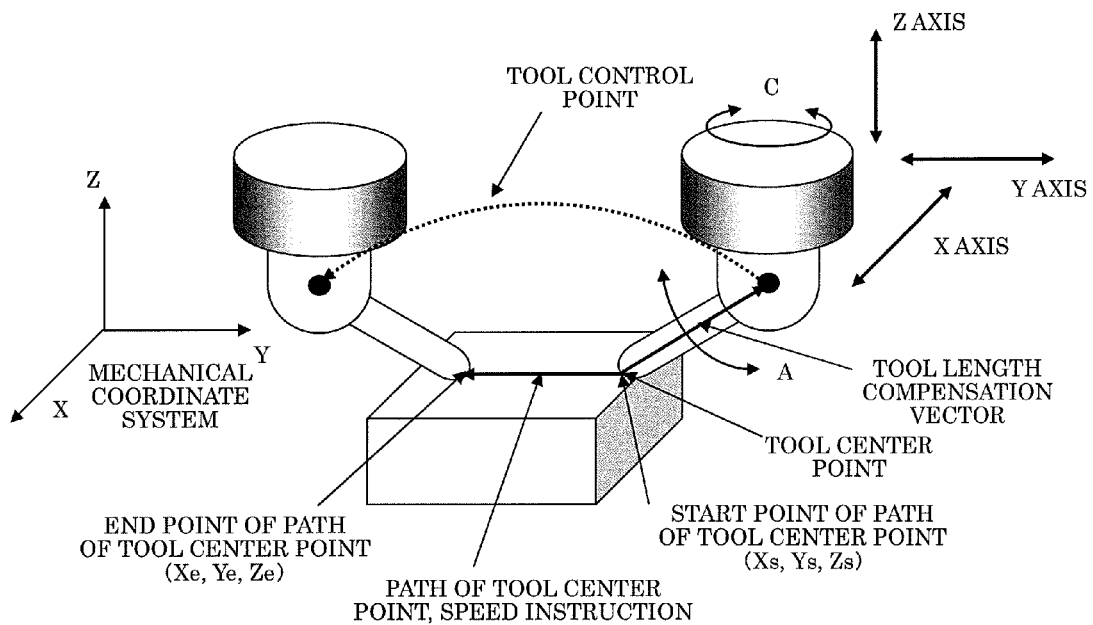
FIG. 3 is a view for describing one example of a machine in which a tool head is rotated with two rotary axes (A axis and C axis)
Figure 6:
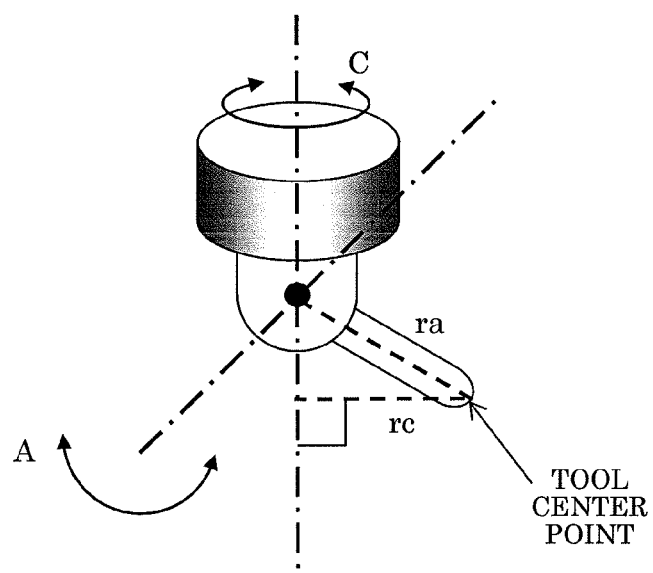
FIG. 6 is a view for describing that, in a tool-head-rotating-type tool-center-point control, a distance from a rotation center of the A axis to a tool center point is defined as ra (the distance from the tool center point to the rotation center of the A axis), while a distance from a rotation center of the C axis to the tool center point is defined as rc.

In the first embodiment, the example in which the table-rotating-type tool-center-point control is carried out as illustrated in FIG. 4 with two rotary axes of A axis and C axis has been described. On the other hand, in the fourth embodiment, the example in which the tool-head-rotating-type tool-center-point control as illustrated in FIG. 3 will be described, in association with the first embodiment. In the tool-head-rotating-type tool-center-point control, a distance from a rotation center of the A axis to a tool center point is defined as ra (the distance from the tool center point to the rotation center of the A axis), while a distance from a rotation center of the C axis to the tool center point is defined as rc, as illustrated in FIG. 6. In general, the distance rc changes in one block, whereas the distance ra is a tool length compensation amount (a distance from the tool center point to an intersection point of the rotation center of the A axis and the rotation center of the C axis), which is constant.

In the case of tool-head-rotating-type tool-center-point control, Drh in an equation (9) is calculated, and the calculated Drh is defined as Dr.

$$Drh = \Sigma \sqrt{kc*\Delta rc + (ra*\Delta A)^2 + (rc*\Delta C)^2} \quad (9)$$

In the above-mentioned equation,
Drh: Tool-direction changing distance
ra: Distance from the rotation center of the A axis (one rotary axis) to the tool center point
rc: Distance from the rotation center of the C axis (other rotary axis) to the tool center point
Δrc: Amount of change in rc for each simulation cycle
kc: Weighting coefficient of Δrc
ΔA, ΔC: Amount of change of A axis and C axis for each simulation cycle Like the equation (5), the equation (9) is for a simulation calculation carried out before the start of the interpolation of a block. Δrc is the amount of change of the distance rc for each simulation cycle for carrying out a simulation calculation of Drh. The kc is the weighting coefficient for weighting the amount of change Δrc. In general, kc=0. The weighting coefficient kc may be a constant such as 1, or may be a function of the distances ra and rc. The weighting coefficient kc is applicable to a fifth embodiment described later. The ΔA and ΔC are amounts of change in the positions of A axis and C axis for each simulation cycle. Σ indicates the total in this block. The simulation cycle is the same as in the equation (5).

Fifth Embodiment

In the second embodiment described above, the example in which the table-rotating-type tool-center-point control is carried out has been described. On the other hand, in the fifth embodiment, the example in which the tool-head-rotating-type tool-center-point control as illustrated in FIG. 3 will be described in association with the second embodiment. Drh in an equation (10) is calculated, and the calculated Drh is defined as Dr. The ra (the distance from the tool center point to the rotation center of the A axis) between the position As of the A axis at the start point of the path of the tool center point and the position Ae of the A axis at the end point of the path of the tool center point, in a certain block, is the tool length compensation amount, which is constant. The rc (the distance from the tool center point to the rotation center of the C axis) at a position Cs of the C axis at the start point of the path of the tool center point in a certain block is defined as rcs, and the rc at a position Ce of the C axis at the end point of the path of the tool center point is defined as rce. The rcn is obtained by the same manner as in the equation (7). The kc is the weighting coefficient for (rce−res).

$$Drh = \sqrt{kc*(rce-rcs) + ra^2*(Ae-As)^2 + rcn^2*(Ce-Cs)^2} \quad (10)$$

In the above-mentioned equation,
Drh: Tool-direction changing distance
As, Cs: Position of A axis (one rotary axis) and position of C axis (other rotary axis) at the start point of the path of the tool center point
Ae, Ce: Position of A axis and position of C axis at the end point of the path of the tool center point
ra: Distance from the rotation center of the A axis to the tool center point
rcs: Distance from the rotation center of the C axis to the tool center point at the position Cs of the C axis at the start point of the path of the tool center point
rce: Distance from the rotation center of the C axis to the tool center point at the position Ce of the C axis at the end point of the path of the tool center point
rcn: Value representative of the distance from the rotation center of the C axis to the tool center point in the block
kc: Weighting coefficient of (rce−rcs)

In the above-mentioned first to fifth embodiments, ra, ras, rae, ran, rb, rbs, rbe, rbn, rc, rcs, rce, or rcn may be a set value such as a parameter, or a program instruction value, in the tool-head-rotating-type tool-center-point control and the table-rotating-type tool-center-point control. In a Program Example 2 described below, RAN182.0 is instructed as the ran in the block of N003. Alternatively, they may be constant values such as 0, 1, 10, or (180/π). The case where ra, ras, rae, ran, rb, rbs, rbe, rbn, rc, rcs, rce, or rcn is 0 means that the corresponding term is not calculated. Accordingly, in the first to fifth embodiments, the calculation of the term having low degree of importance can be skipped by setting ra, ras, rae, ran, rb, rbs, rbe, rbn, rc, rcs, rce, or rcn to be 0.

PROGRAM EXAMPLE 2

N001 G90 X100.0 Y100.0 Z0 A−60.0 B0(C0);
N002 G43.4;
N003 X200.0 A60.0 F10000 RAN182.0

Sixth Embodiment

Figure 7:
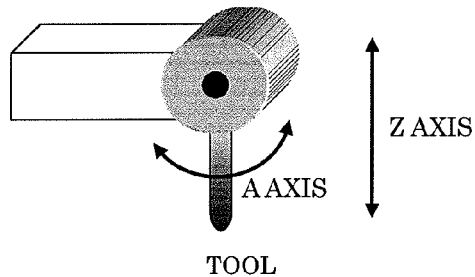
FIG. 7 is a view for describing one example of a mixed-type machining device having two rotary axes, wherein one of them rotates a table, and the other rotates a tool head.
Figure 7:
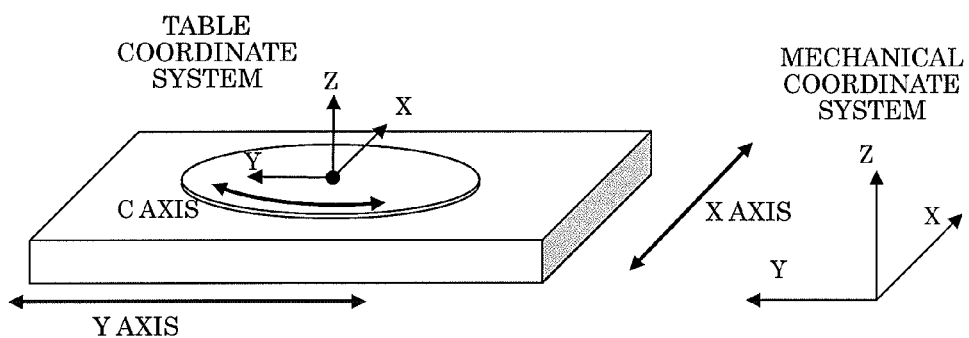

As illustrated in FIG. 7, there is a machine, called a mixed-type machining device, having two rotary axes, wherein one of them rotates a table, and the other rotates a tool head. Here, the table-rotating axis is the C axis, and the tool-head-rotating axis is the A axis. In the machine described above, Drm is calculated as in an equation (11), and the calculated Drm is defined as Dr. Specifically, the Drt calculated by the C axis with respect to the rotation of the table as in the first or second embodiment and the Drh calculated by the A axis with respect to the rotation of the tool head as in the fourth or fifth embodiment are combined into Dr. Alternatively, the Drm may be the sum of the Drt and the Drh as in an equation (12).

$$Drm = \sqrt{Drt^2 + Drh^2} \qquad (11)$$

$$Drm = Drt + Drh \qquad (12)$$

Figure 8:
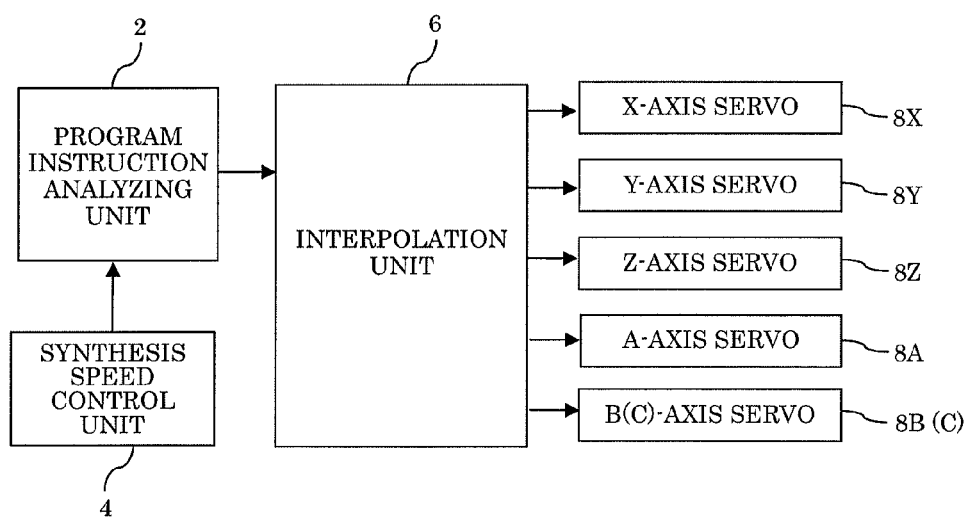
FIG. 8 is a block diagram of a numerical controller provided with a synthesis speed control unit according to the present invention.

In the equations (11) and (12),
Drt: Tool-direction changing distance calculated by the C axis (table-rotating axis) with respect to the rotation of the table
Drh: Tool-direction changing distance calculated by the A axis (tool-head-rotating axis) with respect to the rotation of the tool head As illustrated in FIG. 8, the numerical controller according to the present invention reads and analyzes a program instruction in a program instruction analyzing unit 2, carries out interpolation in an interpolation unit 6 based on the result of the analysis, and drives servos 8X, 8Y, 8Z, 8A, and 8B(C) of respective axes according to the result of the interpolation. A synthesis speed control unit 4 according to the present invention belongs to the program instruction analyzing unit 2.

Figure 9:
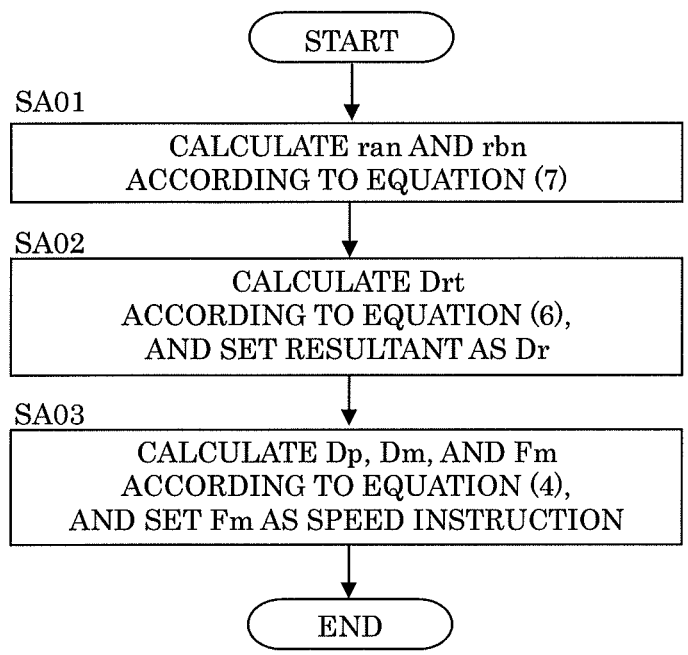
FIG. 9 is a flowchart illustrating a process of the synthesis speed control unit in a second embodiment of the numerical controller according to the present invention.

FIG. 9 is a flowchart illustrating processing of the synthesis speed control unit, according to the second embodiment, by the table-rotating-type tool-center-point control. The respective steps will be described as follows.

[Step SA01] The ran and rbn are calculated according to the equation (7).
[Step SA02] The Drt is calculated according to the equation (6) with the use of the ran and rbn calculated in step SA01, and the calculated one is defined as Dr.
[Step SA03] The Dp is calculated according to the equation (4), and the Dm and Fm are calculated according to the equation (4) with the use of the Dr calculated in step SA02, wherein the Fm is defined as the speed instruction. Then, this process is ended.

Figure 10:
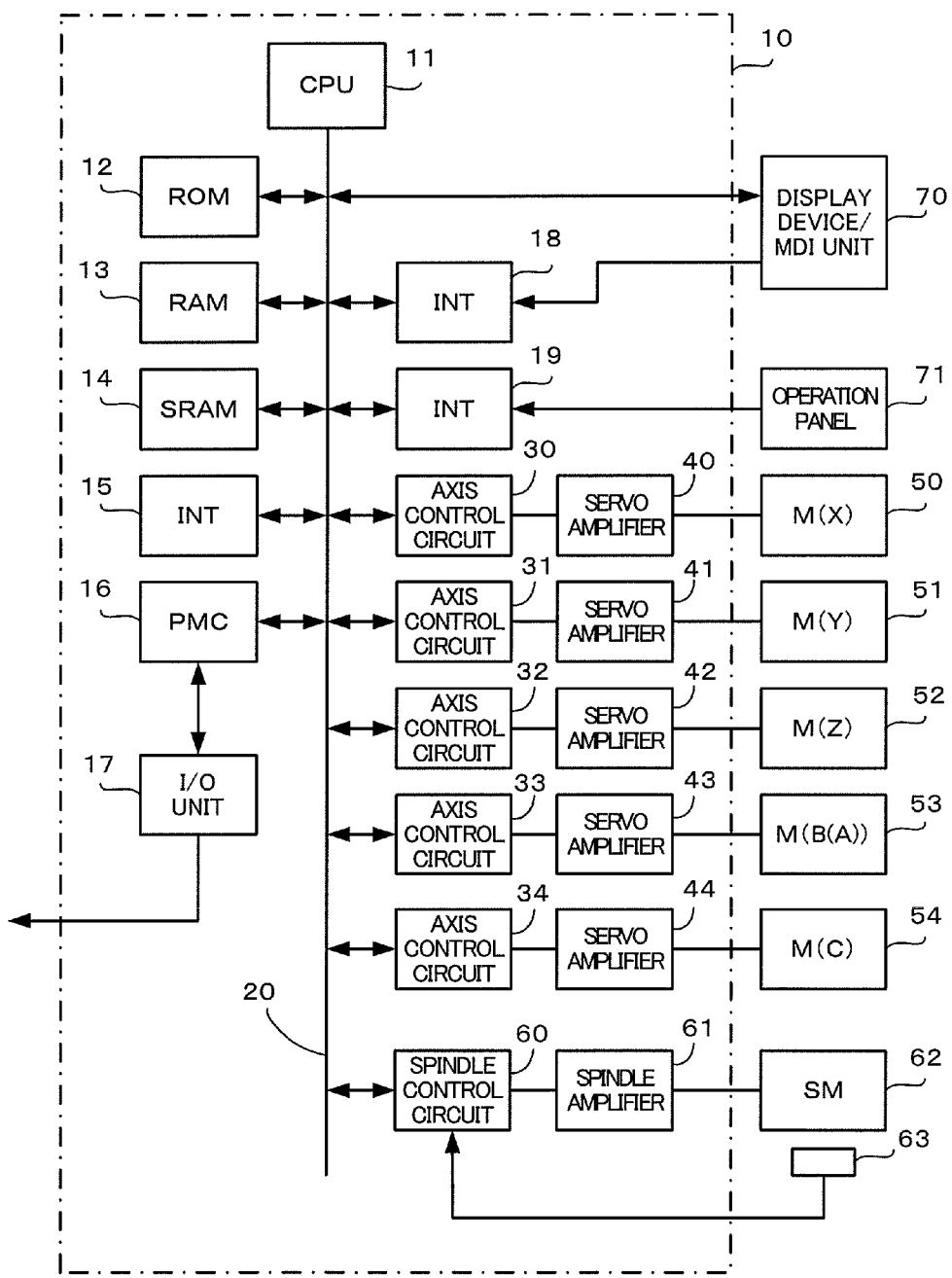
FIG. 10 is a block diagram illustrating a hardware in one embodiment of the numerical controller according to the present invention.

FIG. 10 is a block diagram illustrating a hardware, according to one embodiment, of the numerical controller 10 of the present invention.

A processor (CPU) 11 is for controlling the entire numerical controller 10 and reads a system program stored in a ROM 12 via a bus 20 and controls the entire numerical controller 10 according to the system program. Temporal calculation data or display data and various data input by an operator through a display device/MDI unit 70 are stored in a RAM 13. A SRAM 14 is configured as a non-volatile memory and a machining program read through an interface 15 or a machining program input through the display device/MDI unit 70 is stored in the SRAM 14. Various system programs for executing a process of an editing mode required for creating and editing the machining program and a process of a reproduction mode for automatic driving have been stored in the ROM 12 in advance.

The interface 15 is for an external device (not illustrated) that can be connected to the numerical controller 10 and is connected to, for example, an external device such as an external storage device. A PMC (programmable machine controller) 16 controls an auxiliary device of a machine tool, e.g., an actuator such as a robot hand for exchanging a tool, according to a sequence program incorporated in the numerical controller 10. Specifically, the PMC converts the sequence program into a signal required by the auxiliary device according to a M function, S function and T function instructed by the machining program, and outputs the converted signal to the auxiliary device from an I/O unit 17. The PMC operates the auxiliary devices such as various actuators with this output signal. The PMC also receives signals from a limit switch on the main body of the machine tool or the auxiliary device and various switches on an operation panel arranged on the main body of the machine tool, executes necessary processes, and transmits the result of the processes to the processor 11.

The current position of the machine tool, an alarm, a parameter, and signals such as image data are transmitted to the display device/MDI unit 70, and displayed on a display. The display device/MDI unit 70 is a manual data input device provided with a display and a keyboard.

An interface 18 receives the data from the keyboard of the display device/MDI unit 70, and transmits the same to the processor 11. An interface 19 is connected to a manual pulse generator (not illustrated) mounted on an operation panel 71. The manual pulse generator is used for precisely positioning a movable unit of the machine tool by controlling of respective axes with the use of distribution pulses based on a manual operation.

Axis control circuits 30 to 34 receive a moving instruction for each axis from the processor 11 and output the instruction for each axis to servo amplifiers 40 to 44. The servo amplifiers 40 to 44 receive the instruction and drive servo motors 50 to 54 of each axis of the machine tool. In this case, servo motors 50, 51 and 52 are used to drive the linear axes of X, Y, and Z axes, respectively, while the servo motors 53 and 54 are used to drive the rotary axes of B (A) and C axes, respectively.

The servo motors 50 to 54 of the respective axes have incorporated therein a detection device for detecting a position. A position detecting signal from the position detecting device is fed back to the axis control circuits 30 to 34 of the respective axes as a pulse train. For example, a linear scale is used as the position detecting device, according to the circumstances. A speed signal can be generated by applying a frequency/speed conversion to the pulse train. In FIG. 10, illustrations of feedback of the position signal and feedback of speed are omitted.

A spindle control circuit 60 receives a spindle rotation instruction to the machine tool, and outputs a spindle speed signal to a spindle amplifier 61. The spindle amplifier 61, receiving the spindle speed signal, rotates a spindle motor 62 of the machine tool with the instructed machining rotation speed. A position detector 63 is connected to the spindle motor 62. The position detector 63 outputs a feedback pulse in synchronisation with the rotation of the spindle, and the output feedback pulse is fed back to the spindle control circuit 60.

In the explanation of the above-mentioned embodiments of the present invention, the instruction of the path of the tool center point during the tool-center-point control is a linear interpolation instruction. However, as in the above-mentioned embodiments, the present invention is applicable to a curve interpolation (arc interpolation and other curve interpolations) other than the linear interpolation by calculating the synthesis speed with respect to the synthesis distance of the relative moving distance between the workpiece and the tool center point and the tool-direction changing distance due to the relative change in the tool direction with respect to the workpiece by the rotary axis.

As described above, the present invention relates to a numerical controller for controlling a multi-axis machining device that machines a mounted workpiece by using at least three linear axes and at least one rotary axis, wherein the numerical controller includes a synthesis speed control unit that sets a speed instruction so that the speed instruction is a synthesis speed with respect to a synthesis distance of a relative moving distance between the workpiece and a tool center point and a tool-direction changing distance due to the relative change in the tool direction with respect to the workpiece by a rotary axis, when a tool-center-point control is executed in which a path of a tool center point is instructed and the workpiece is machined along the path of the tool center point based on the speed instruction.

By virtue of this structure, the tool can be moved by respective axes including a rotary axis with a stable speed, with the result that the numerical controller can prevent a machining error, a vibration of a machine, or an occurrence of a servo alarm, thereby enabling to carry out precise machining at a tool center point by a tool-center-point control.

The invention claimed is:

1. A numerical controller for controlling a multi-axis machining device which machines a workpiece mounted on a table by using at least three linear axes and at least one rotary axis while changing a relative direction of a tool with respect to the workpiece,
wherein said numerical controller, for executing a tool-center-point control in which a path of a tool center point with respect to the workpiece is instructed so as to move and machine the workpiece along the instructed path of the tool center point based on a speed instruction, comprises:
a synthesis speed control unit that sets said speed instruction so that said speed instruction is a synthesis speed with respect to a synthesis distance of a relative moving distance between the workpiece and a tool center point and a tool-direction changing distance due to a relative change in a tool direction with respect to the workpiece by the rotary axis; and
an interpolation unit that interpolates positions of the linear axes and a position of the rotary axis by the tool-center-point control based on the speed instruction according to the synthesis speed,
wherein the linear axes and the rotary axis are driven to the positions of the linear axes and the position of the rotary axis created by the interpolation unit.

2. The numerical controller according to claim 1, wherein said at least one rotary axis is two rotary axes for rotating the table, and the tool-direction changing distance is obtained from an equation below:

$$Drt = \sum \sqrt{ka*\Delta ra^2 + kb*\Delta rb^2 + (ra*\Delta A)^2 + (rb*\Delta B)^2}$$

in which
Drt: Tool-direction changing distance
ra: Distance from a rotation center of an A axis (as one rotary axis) to the tool center point
rb: Distance from a rotation center of a B axis (as another rotary axis) to the tool center point
$\Delta ra$: Amount of change in ra for each simulation cycle
$\Delta rb$: Amount of change in rb for each simulation cycle
ka: Weighting coefficient of $\Delta ra$
kb: Weighting coefficient of $\Delta rb$
$\Delta A$, $\Delta B$: Amount of change of A axis and B axis for each simulation cycle.

3. The numerical controller according to claim 1, wherein said at least one rotary axis is two rotary axes for rotating the table, and the tool-direction changing distance is obtained from an equation below:

$$Drt = \sqrt{ka*(rae-ras)^2 + kb*(rbe-rbs)^2 + ran^2*(Ae-As)^2 + rbn^2*(Be-Bs)^2}$$

in which
Drt: Tool-direction changing distance
As, Bs: Position of A axis (as one rotary axis) and position of B axis (as another rotary axis) at the start point of the path of the tool center point
Ae, Be: Position of A axis and position of B axis at the end point of the path of the tool center point
ras: Distance from the rotation center of the A axis to the tool center point at a position As of the A axis at the start point of the path of the tool center point
rae: Distance from the rotation center of the A axis to the tool center point at a position Ae of the A axis at the end point of the path of the tool center point
ran: Value representative of the distance from the rotation center of the A axis to the tool center point in a block rbs: Distance from the rotation center of the B axis to the tool center point at a position Bs of the B axis at the start point of the path of the tool center point rbe: Distance from the rotation center of the B axis to the tool center point at a position Be of the B axis at the end point of the path of the tool center point rbn: Value representative of the distance from the rotation center of the B axis to the tool center point in a block ka: Weighting coefficient of (rae−ras)

kb: Weighting coefficient of (rbe−rbs).

4. The numerical controller according to claim 1, wherein the rotary axis is a rotary axis for rotating a tool head, and the tool-direction changing distance is obtained from an equation below:

$$Drh = \sum \sqrt{kc*\Delta rc + (ra*\Delta A)^2 + (rc*\Delta C)^2}$$

in which

Drh: Tool-direction changing distance ra: Distance from a rotation center of an A axis (as one rotary axis) to the tool center point rc: Distance from a rotation center of a C axis (as another rotary axis) to the tool center point Δrc: Amount of change in rc for each simulation cycle kc: Weighting coefficient of Δrc ΔA, ΔC: Amount of change of A axis and C axis for each simulation cycle.

5. The numerical controller according to claim 1, wherein said at least one rotary axis is two rotary axes for rotating a tool head, and the tool-direction changing distance is obtained from an equation below:

$$Drh = \sqrt{kc*(rce-rcs) + ra^2*(Ae-As)^2 + rcn^2*(Ce-Cs)^2}$$

in which

Drh: Tool-direction changing distance

As, Cs: Position of A axis (as one rotary axis) and position of C axis (as another rotary axis) at the start point of the path of the tool center point Ae, Ce: Position of A axis and position of C axis at the end point of the path of the tool center point ra: Distance from the rotation center of the A axis to the tool center point rcs: Distance from the rotation center of the C axis to the tool center point at a position Cs of the C axis at the start point of the path of the tool center point rce: Distance from the rotation center of the C axis to the tool center point at a position Ce of the C axis at the end point of the path of the tool center point rcn: Value representative of the distance from the rotation center of the C axis to the tool center point in a block kc: Weighting coefficient of (rce−rcs).

6. The numerical controller according to claim 1, wherein said at least one rotary axis is two rotary axes for rotating the table and a tool head, and the tool-direction changing distance is obtained from an equation $$Drm = \sqrt{Drt^2 + Drh^2}$$

or from an equation $$Drm = Drt + Drh$$

in which

Drt is a tool-direction changing distance calculated by a C axis (table-rotating axis) with respect to the rotation of the table and expressed by the following equation $$Drt = \sum \sqrt{ka*\Delta ra^2 + kb*\Delta rb^2 + (ra*\Delta A)^2 + (rb*\Delta B)^2}$$

in which

Drt: Tool-direction changing distance ra: Distance from a rotation center of an A axis (as one rotary axis) to the tool center point rb: Distance from a rotation center of a B axis (as another rotary axis) to the tool center point Δra: Amount of change in ra for each simulation cycle Δrb: Amount of change in rb for each simulation cycle ka: Weighting coefficient of Δra kb: Weighting coefficient of Δrb ΔA, ΔB: Amount of change of A axis and B axis for each simulation cycle, or expressed by the following equation $$Drt = \sqrt{ka*(rae-ras)^2 + kb*(rbe-rbs)^2 + ran^2*(Ae-As)^2 + rbn^2*(Be-Bs)^2}$$

in which

Drt: Tool-direction changing distance

As, Bs: Position of A axis (as one rotary axis) and position of B axis (as another rotary axis) at the start point of the path of the tool center point Ae, Be: Position of A axis and position of B axis at the end point of the path of the tool center point ras: Distance from the rotation center of the A axis to the tool center point at a position As of the A axis at the start point of the path of the tool center point rae: Distance from the rotation center of the A axis to the tool center point at a position Ae of the A axis at the end point of the path of the tool center point ran: Value representative of the distance from the rotation center of the A axis to the tool center point in a block rbs: Distance from the rotation center of the B axis to the tool center point at a position Bs of the B axis at the start point of the path of the tool center point rbe: Distance from the rotation center of the B axis to the tool center point at a position Be of the B axis at the end point of the path of the tool center point rbn: Value representative of the distance from the rotation center of the B axis to the tool center point in a block ka: Weighting coefficient of (rae−ras)

kb: Weighting coefficient of (rbe−rbs), and in which

Drh is a tool-direction changing distance calculated by an A axis (tool-head-rotating axis) with respect to the rotation of the tool head and expressed by the following equation $$Drh = \sum \sqrt{kc*\Delta rc + (ra*\Delta A)^2 + (rc*\Delta C)^2}$$

in which
- Drh: Tool-direction changing distance
- ra: Distance from a rotation center of an A axis (as one rotary axis) to the tool center point
- rc: Distance from a rotation center of a C axis (as another rotary axis) to the tool center point
- Δrc: Amount of change in rc for each simulation cycle
- kc: Weighting coefficient of Δrc
- ΔA, ΔC: Amount of change of A axis and C axis for each simulation cycle, or expressed by the following equation $$Drh = \sqrt{kc*(rce-rcs) + ra^2*(Ae-As)^2 + rcn^2*(Ce-Cs)^2}$$

in which
- Drh: Tool-direction changing distance
- As, Cs: Position of A axis (as one rotary axis) and position of C axis (as another rotary axis) at the start point of the path of the tool center point
- Ae, Ce: Position of A axis and position of C axis at the end point of the path of the tool center point
- ra: Distance from the rotation center of the A axis to the tool center point
- rcs: Distance from the rotation center of the C axis to the tool center point at a position Cs of the C axis at the start point of the path of the tool center point
- rce: Distance from the rotation center of the C axis to the tool center point at a position Ce of the C axis at the end point of the path of the tool center point
- rcn: Value representative of the distance from the rotation center of the C axis to the tool center point in a block
- kc: Weighting coefficient of (rce−rcs).

7. The numerical controller according to claim 2, wherein the ra and rb are set values, program instruction values, or constant values.

8. The numerical controller according to claim 3, wherein ras, rae, ran, rbs, rbe, and rbn are set values, program instruction values, or constant values.

9. The numerical controller according to claim 4, wherein the ra and rc are set values, program instruction values, or constant values.

10. The numerical controller according to claim 5, wherein the ra, rcs, rce, and rcn are set values, program instruction values, or constant values.

* * * * *